United States Patent
Terae et al.

(10) Patent No.: US 6,957,037 B2
(45) Date of Patent: Oct. 18, 2005

(54) IMAGE READING APPARATUS AND IMAGE FORMING APPARATUS HAVING THE SAME

(75) Inventors: Takuya Terae, Chiba (JP); Yuichi Makino, Ibaraki (JP); Masaki Seto, Ibaraki (JP); Kentaro Mori, Ibaraki (JP)

(73) Assignees: Canon Kabushiki Kaisha, Tokyo (JP); Canon Finetech Inc., Ibaraki (JP)

( * ) Notice: Subject to any disclaimer, the term of this patent is extended or adjusted under 35 U.S.C. 154(b) by 0 days.

(21) Appl. No.: 10/673,584

(22) Filed: Sep. 30, 2003

(65) Prior Publication Data

US 2005/0025541 A1 Feb. 3, 2005

(30) Foreign Application Priority Data

Oct. 1, 2002 (JP) .......... 2002-289086
Aug. 29, 2003 (JP) .......... 2003-209515

(51) Int. Cl.[7] .......... G03B 23/00; G03G 15/00
(52) U.S. Cl. .......... 399/380; 355/76
(58) Field of Search .......... 399/377, 379, 399/380; 355/75, 76; 358/474

(56) References Cited

U.S. PATENT DOCUMENTS 6,131,898 A 10/2000 Hiroi et al. .......... 271/10.03
6,405,017 B1 6/2002 Takahashi et al. .......... 399/380

Primary Examiner—Ren Yan
(74) Attorney, Agent, or Firm—Fitzpatrick, Cella, Harper & Scinto

(57) ABSTRACT

This present invention provides an image reading apparatus aiming at improving its operability while saving the cost and an image forming apparatus provided with the same. Sponges for pressing a pressing plate against a platen glass are constituted of nine sponges. Then, restoration forces Fa to Fc generated when sponges on a front side of a document feeding apparatus far from a fulcrum shaft of a hinge unit are crushed are set smaller than restoration forces Fg to Fi generated when sponges on a deep side of the document feeding apparatus near the fulcrum shaft 45 of the hinge unit are crushed.

12 Claims, 12 Drawing Sheets

Fig.6
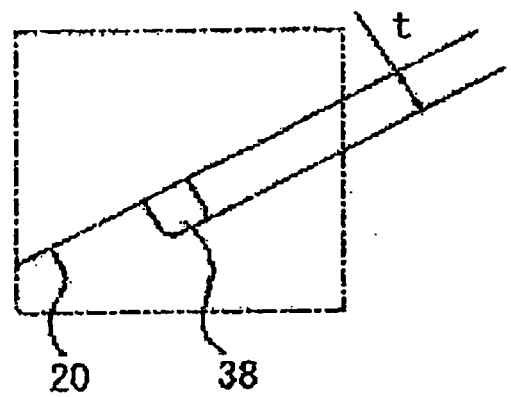
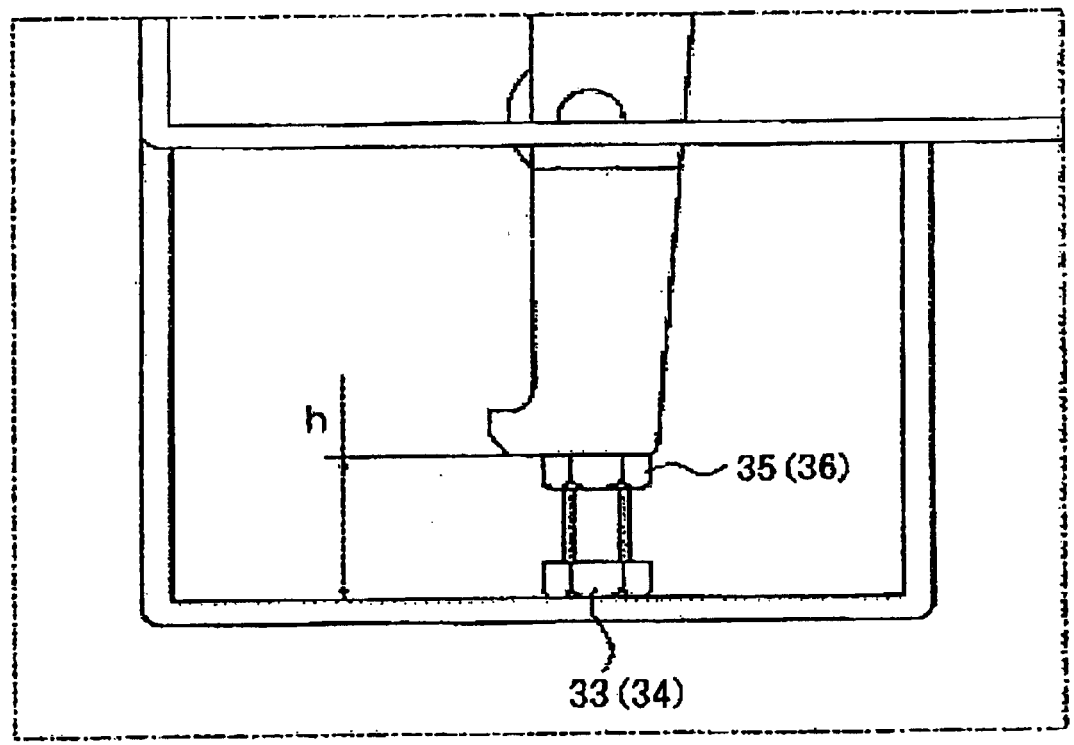

IMAGE READING APPARATUS AND IMAGE FORMING APPARATUS HAVING THE SAME

BACKGROUND OF THE INVENTION

1. Field of the Invention

The present invention relates to an image reading apparatus having a document feeding apparatus for conveying a original document.

2. Description of the Related Art

Conventionally, as described in for example, U.S. Pat. No. 6,405,017, a document reading apparatus having a document pressing plate provided such that the pressing plate is capable of being opened or closed in order to press a document against a contact glass has been well known. In the document reading apparatus having such a structure, the pressing plate is requested that the weight of the document pressing plate for pressing the document should be small and that the pressing face should be flat so as to keep the document into a firm contact with the contact glass throughout the entire range. Thus, in order to prevent warp or distortion of the document pressing plate from being transmitting to the pressing sheet, an elastic members is disposed between the document pressing plate and the pressing sheet member for pressing the document against the contact glass and further, the arrangement of such an elastic member has been devised in many ways.

Additionally, another image reading apparatus capable of selecting flow scanning type in which a document image is scanned while the original document is being conveyed and fixed scanning type in which a document image is scanned while the document such as a book page is fixed has been known also. Such an image reading apparatus is adopted in a copying machine and the like.

In this image reading apparatus, a document feeding apparatus is provided such that the apparatus is rotatable with respect to its reading apparatus main body.

In the case of the flow scanning type, the original document is conveyed by the document feeding apparatus and the document image is scanned by scanning means provided on the reading apparatus main body. On the other hand, in the case of the fixed scanning type, the document is placed on the document base and that document is pressed against the document base by the pressing plate provided on the back face of the document feeding apparatus and then scanned.

FIG. 11 shows a perspective view of the pressing plate in an image reading apparatus based on conventional technology.

In the case of the fixed scanning type, to scan an image at a high precision, it is necessary to make the entire face of the document (book pages) into a firm contact with the platen glass which is a document base for fixed scanning of the document.

For that purpose, the document needs to be pressed sufficiently by the pressing plate such that the entire face thereof never floats from the platen glass.

Conventionally, as shown in FIG. 11, a sponge 202, which is an elastic member, is attached to the entire range of the back face of a pressing plate 201. Then, when the pressing plate 201 is closed against the platen glass which is a document base for fixed scanning of the document, a pressing force for pressing the document by the pressing plate 201 is generated by a restoration force generated by elastic deformation of the sponge 202.

As shown in FIG. 12, a document feeding apparatus 200 capable of selecting the flow scanning type and the fixed scanning type has abutting means 205 for restricting a pass gap between the document feeding apparatus 200 and the image reading apparatus 203 by abutting against the image reading apparatus 203 in order to secure a predetermined pass gap at a scanning position in the case of the flow scanning type on the front side (right in FIG. 12) and the deep side (left in FIG. 12) of the document feeding apparatus 200.

In such a conventional image reading apparatus, adjustment for generating a uniform pressing force on an entire back face of the pressing plate 201 is required to heighten a scanning accuracy in the case of the fixed scanning type.

If the abutting condition of the abutting means 205 to the image reading apparatus 203 is adjusted to an appropriate one with the document feeding apparatus 200 closed, the sponge 202 is uniformly deformed elastically by only a predetermined amount so that the restoration forces Fa to Fc generated at that time are equalized.

Further, because the document feeding apparatus 200 is provided with a driving device including a document feeding motor and the like, its weight is quite large so that a large amount of operation force is required to open/close the document feeding apparatus 200 Such a document feeding apparatus 200 has a mechanism for applying a force in an opening direction of the document feeding apparatus 200 to a hinge unit 204 in order to relax the operation force when the document feeding unit is opened/closed.

When the document feeding apparatus 200 is closed, closing forces FA to FC obtained by subtracting the biasing force acting in the opening direction of the hinge unit 204 from a force descending due to the weight of the document feeding apparatus 200 act.

If the closing force of the document feeding apparatus 200 is smaller than a predetermined value, the sponge 202 attached to the entire back face of the pressing plate 201 cannot be crushed completely. Thus, not only it takes a long time to adjust the height to abut the document feeding apparatus 200 to the image reading apparatus 203, but also there is another problem that the document feeding apparatus may not be settled uniformly.

To prevent this phenomenon, the biasing force for biasing the document feeding apparatus 200 in the opening direction by the hinge unit 204 is weakened so that the closing force of the document feeding apparatus is relatively increased to be sufficiently larger than the restoration of the sponge.

However, there is such a problem that because the biasing force in the opening direction of the hinge unit 204 is set to weaken, a user's operation force for opening the document feeding apparatus 200 is increased.

Further, there is a problem that because the closing force is large, an impact sound generated when the document feeding apparatus is closed is increased.

Further, there is a problem that because it takes a larger cost if the sponge area is larger, reduction of the cost cannot be achieved.

As described above, according to the conventional technology, the structure of the pressing plate of the document feeding apparatus intensifies the operation force for opening the document feeding apparatus, thereby possibly leading to worsening of the operability.

SUMMARY OF THE INVENTION

Accordingly, an object of the present invention is to provide an image reading apparatus in which an operation force for opening the document feeding apparatus is reduced so as to improve its operability.

To achieve the above object, according to one aspect of the present invention, there is provided an image reading apparatus comprising: a reading apparatus main body having a document base for placing a original document and scanning means for scanning an image of the original document placed by the document base; a document pressing device which is provided such that the apparatus is rotatable with respect to the reading apparatus main body and conveys the original document to a scanning position on the document base; and an opening/closing unit which supports the document pressing device such that the apparatus is capable of being opened/closed with respect to the reading apparatus main body and has a mechanism for applying a predetermined force in a direction of opening the document pressing device, wherein the document pressing device has a pressing plate for pressing the original document placed on the document base and plurality of elastic members provided on a face opposite to the document base of the pressing plate, and the restoration forces of the plurality of elastic members generated by deformation when the document pressing device is closed with respect to the reading apparatus main body are set to be smaller such that the elastic members go apart from the center of rotating of the document pressing device.

Another aspect of the present invention is to provide the image reading apparatus, wherein the plurality of elastic members have a smaller thickness of the elastic member as the elastic member are disposed at a farther position from the center of rotating of the document pressing device.

Still another aspect of the present invention is to provide the image reading apparatus, wherein the plurality of elastic members have a smaller modulus of elasticity as the elastic members are disposed at a farther position from the center of rotating of the document pressing device.

Still another aspect of the present invention is to provide the image reading apparatus, wherein the plurality of elastic members have a smaller contact area with the pressing plate as the elastic members are disposed at a farther position from the center of rotating of the document pressing device.

Still another aspect of the present invention is to provide the image reading apparatus comprising: holding means for holding a gap between the document pressing device and the document base at a predetermined gap; and adjusting means for adjusting the predetermined gap by the holding means.

Still another aspect of the present invention is to provide the image reading apparatus, wherein the document pressing device has a document feeding means which conveys the original document to a scanning position on a document base.

Still another aspect of the present invention is to provide the image reading apparatus comprising: an image reading apparatus for scanning a document image; and an image forming unit for forming an image based on information of the scanned document image, wherein the image reading apparatus is the image reading apparatus according to any one of the previous aspects.

BRIEF DESCRIPTION OF THE DRAWINGS

In the accompanying drawings:

FIG. 6 is a partially enlarged diagram of FIG. 5;

DESCRIPTION OF THE PREFERRED EMBODIMENTS

Hereinafter, the preferred embodiments of the present invention will be described in detail with reference to the accompanying drawings. Unless mentioned specifically, the scope of the present invention is not restricted to the dimension, material, shape and relative composition of components described in this embodiment.

(Image Forming Apparatus)

Figure 1:
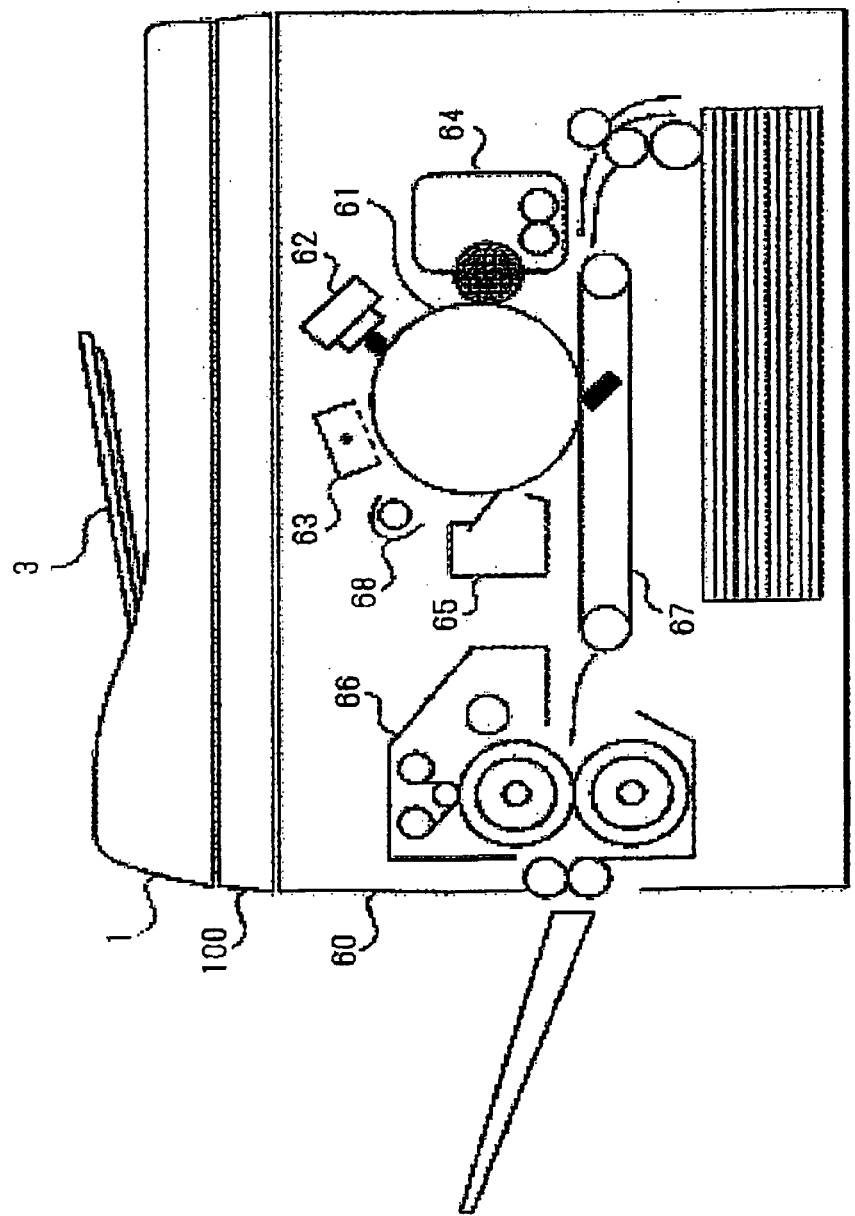
FIG. 1 is a schematic sectional view of an image forming apparatus of an embodiment of the present invention.

First, the structure and operation of the image forming apparatus will be described with reference to FIG. 1. If an image scanning start signal is inputted to the image forming apparatus, as shown in FIG. 1, its photosensitive drum 61 is charged with electricity so as to have a predetermined potential by charging means 63. On the other hand, images of the documents are scanned by the document feeding apparatus 1 which scans the document when it is conveyed and the reading apparatus main body 100 and then, an image signal is transmitted to the image forming unit 60 for forming images.

An image forming unit 30 forms electrostatic latent image corresponding to the document image on the photosensitive drum 61 by exposure means 62 such as an LED, laser which repeats ON/OFF of light emission by receiving the aforementioned image signal. Next, this electrostatic latent image is developed by a development unit 64 which is development means accommodating toner particles so as to obtain a toner image on the photosensitive drum 61.

In this way, the toner image formed on the photosensitive drum 61 is transferred electrostatically onto a recording medium such as paper, OHP sheet by a transfer unit 67. After that, the recording medium is separated electrostatically and conveyed to a fixing unit 66 in which the image is heat-fixed and outputted.

On the other hand, after the toner image is transferred, a surface of the photosensitive drum 61 is cleaned by a cleaner 65 to remove adhering contamination such as remaining toner and if necessary, exposed by pre-exposure means 68 to remove optical memory (ghost) of image exposure.

(Image Reading Apparatus)

Next, the image reading apparatus according to an embodiment of the present invention will be described with reference to FIGS. 2 to 10.

First, the entire structure of the image reading apparatus of this embodiment will be described with reference to FIGS. 2 and 3.

Figure 2:
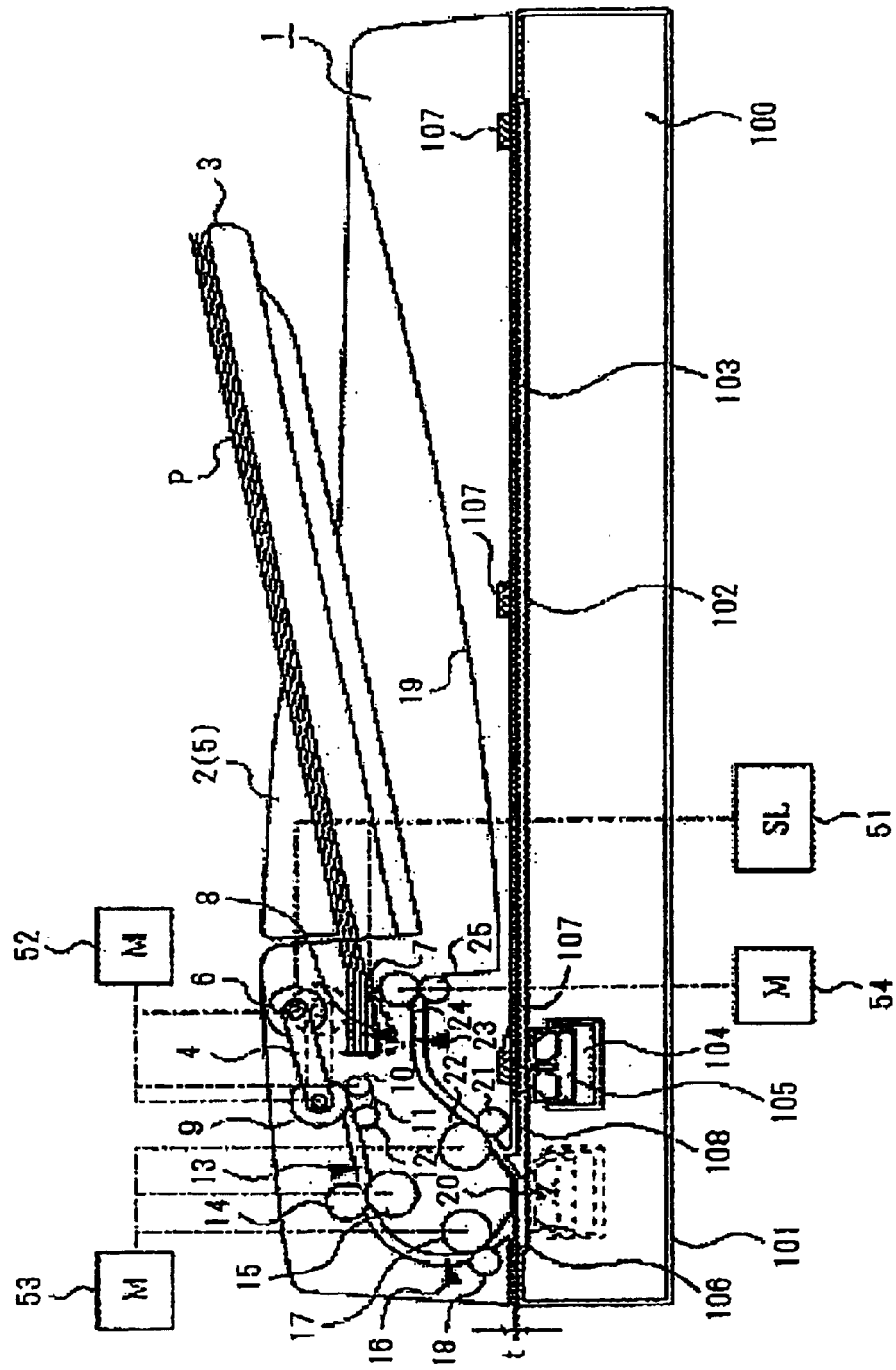
FIG. 2 is a schematic sectional view of an image reading apparatus of the embodiment of the present invention.

FIG. 2 shows a schematic sectional view of the image reading apparatus according to the embodiment of the present invention. FIG. 3 shows a top view of the reading apparatus main body.

As shown in FIG. 2, the image reading apparatus of this embodiment comprises the document feeding apparatus 1 and the reading apparatus main body 100.

In this figure, reference numeral 101 denotes a case which constitutes an appearance of the reading apparatus main body 100 for accommodating respective components.

A platen glass 102 for the fixed scanning of the document is fixed on the top of the case 101. If the fixed scanning is carried out, this platen glass 102 places a document (book pages). According to this embodiment, to place the document on the platen glass 102, the document feeding apparatus 1 is joined to the case 101 on a deep side in this figure through a hinge unit 31 (32) described later and the front side (on this figure) of the document feeding apparatus 1 can be opened/closed freely with respect to the platen glass 102. For convenience for explanation, here, the side of the hinge unit 31 (32) is called deep side and the opening/closing side is called front side.

Further, a platen glass 106 for flow scanning of the document is fixed on the top of the case 101. This platen glass 106 is used to scan an image of the document conveyed by the document feeding apparatus 1 in the case of the flow scanning.

A jump stage 108 is provided between the platen glass 102 and the platen glass 106. This jump stage 108 is used to transfer a document conveyed by the document feeding apparatus 1 in the case of flow scanning from the platen glass 106 to the document feeding apparatus 1.

A pressing plate 103 is provided on a back face of the document feeding apparatus 1. This pressing plate 103 is used for pressing the document against the platen glass 102 in case where the fixed scanning is carried out. A plurality of sponges 107, which are the elastic members, for generating a pressing force of the pressing plate 103 are provided on the back face of the pressing plate 103.

An image reading unit 104 as scanning means is provided inside the case 101. This image reading unit 104 includes an image sensor 105 for converting a scanned image to electric information.

This image reading unit 104 is capable of being reciprocated at a predetermined distance by driving means described later so as to change its position depending on the fixed scanning type or the flow scanning type.

Figure 4:
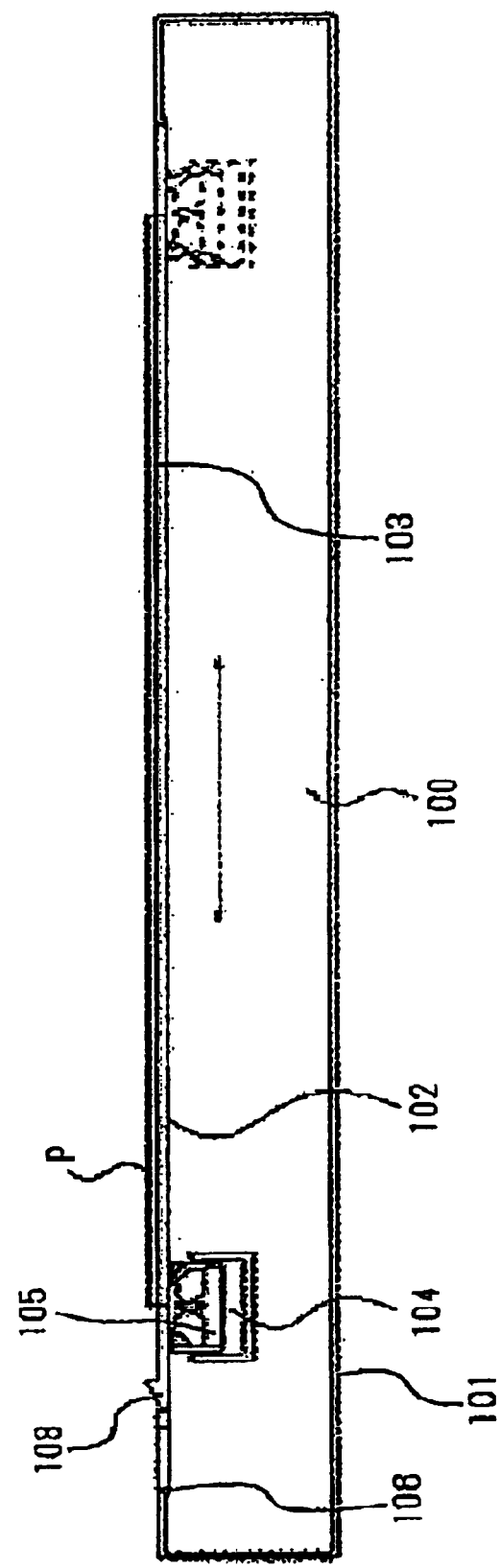
FIG. 4 is an explanatory diagram for explaining a scanning state based on a fixed scanning type of the image reading apparatus of the embodiment of the present invention.

In the case where the fixed scanning type is carried out, as shown in FIG. 4, the image reading unit 104 is moved from a home position (solid line position in the same figure) below the jump stage 108 up to a position matching the document size in the direction of an indicated arrow (dotted line position in the same figure). During this moving process, an image of a document (book page) P placed on the platen glass 102 is scanned by the image reading unit 104. Meanwhile, a document size is detected by document size detecting means (not shown). In FIG. 4, representation of the document feeding apparatus 1 is omitted for explaining the reading apparatus main body 100.

In the case of the flow scanning, as shown in FIG. 2, the image reading unit 104 is moved up to a predetermined scanning position (dotted line position in the same figure) below the platen glass 106. With the image reading unit 104 stationary, the image of the document (original document) P conveyed by the document feeding apparatus 1 is scanned.

Next, a document fixed scanning action based on the fixed scanning type will be described.

The case 101 is provided with a guide rail 109 for guiding the image reading unit 104 which reciprocates and a motor 110 which is a driving source for reciprocating the image reading unit 104.

The motor 110 is engaged with a drive gear pulley 111. The drive gear pulley 111 is coupled with a driven pulley 113 in a ring-like manner by means of a timing belt 112. Further, the timing belt 112 is engaged with a housing 115 for holding an image sensor 105.

Such a structure enables the image reading unit 104 to be reciprocated.

Figure 3:
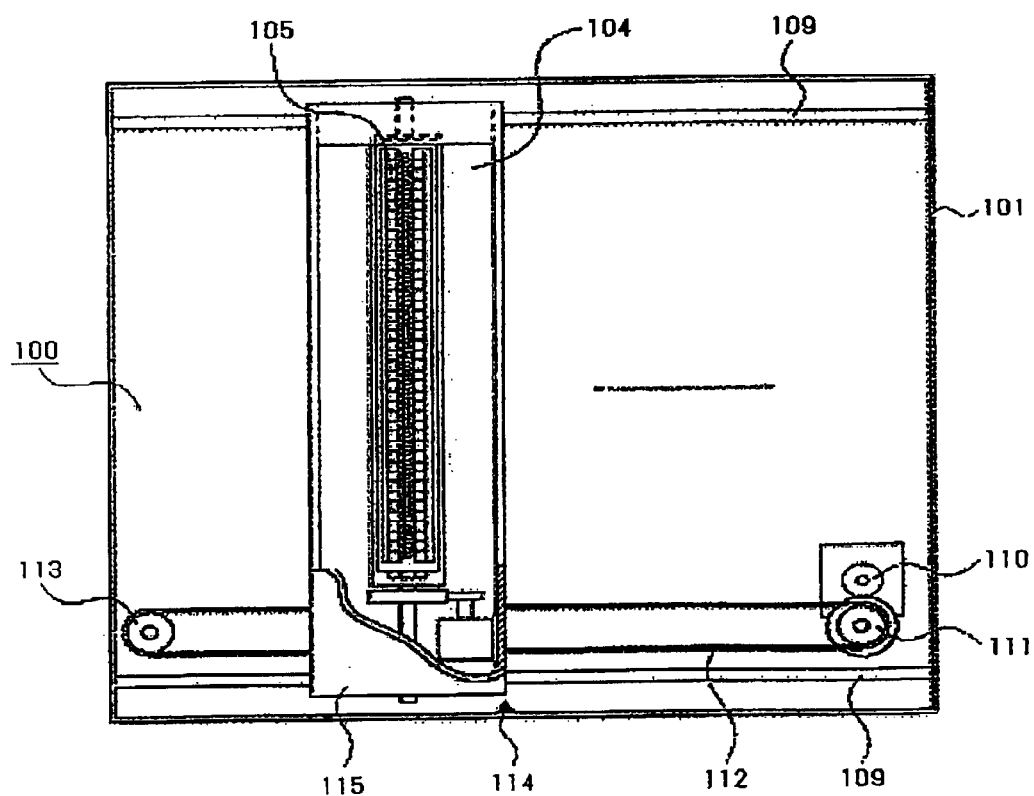
FIG. 3 is a top view of the document reading apparatus.

When the image reading unit 104 is reciprocated in the direction of an arrow indicated in FIG. 3 by normal and reverse rotations of the motor 110, the image of the document (book page) P placed on the platen glass 102 is scanned.

The document P placed on the platen glass 102 is pressed against the platen glass 102 by the pressing plate 103 with a restoration force generated from a sponge 107 crushed by a load when the document feeding apparatus 1 is closed as described later.

Consequently, the document can be prevented from floating from the platen glass 102 on its entire range. Therefore, at the time of image scanning, image scanning failure can be prevented.

Next, document flow scanning action based on the flow scanning type will be described with reference to FIGS. 2 and 3.

As shown in FIG. 3, the document feeding apparatus 1 is provided with a position detecting sensor 114 for detecting a scanning position of the image reading unit 104 when the image of the document (original document) P conveyed by the document feeding apparatus 1 is scanned. The image reading unit 104 conveyed by the driving means is detected by this position detecting sensor 114 and stopped at a predetermined scanning position.

The flow scanning of the document is carried out by scanning the image of the document (original document) P conveyed by the document feeding apparatus 1 from the bottom face of the platen glass 106 fixed on the case 101.

A gap between a white board 20 and the platen glass 106 is maintained at a predetermined minute gap t shown in FIG. 2 at both the front side and deep side of the document feeding apparatus 1 by adjustment of the heights of the document feeding apparatus 1 and the reading apparatus main body 100. In the meantime, this height adjustment will be described in detail later.

Thus, the document (original document) P conveyed by the document feeding apparatus 1 passes this minute gap t.

As a result, no floating of the document from the platen glass 106 occurs on its entire surface like at the time of the fixed scanning of the document when the document image is scanned. Therefore, document scanning failure can be prevented.

(Document Feeding Apparatus)

As shown in FIG. 2, the document feeding apparatus 1 is located above the reading apparatus main body 100. A document set tray 3 is provided to load plurality of documents (original documents) whose images are to be scanned.

This document set tray 3 has a pair of width direction restricting plates 2 (5), which are disposed on the front side and deep side so that they are capable of sliding in the width direction of the document. This pair of the width direction restricting plates 2 (5) on the front side and deep side secures stability of conveying the document at the time of the feeding.

A feed roller 6 is provided above the document set tray 3. This feed roller 6 is driven by a separation transport roller 9 so as to feed a document. The feed roller 6 feeds one by one from plurality of documents set on the document set tray 3.

Usually, the feed roller 6 is retracted to its upper position (solid line position in the same figure) which is a home position thereby not hampering a document setting procedure.

Reference numeral 7 denotes a shutter which the documents butt when they are set on the tray. Usually, the shutter 7 is held at the upper position (solid line position in the same figure) which is a home position and descended to the dotted line position when feeding of the document is started, so as to open a document entry port.

Further, when that feeding operation is started, the feed roller 6 is descended to the dotted line position in the same figure so that it abuts to a top face of the document. This feed roller 6 is supported axially by an arm 4. The feed roller 6 is moved up and down with an oscillating of this arm 4.

At an end of the document set tray 3 are disposed the separation transport roller 9 which is a separation unit for separating the documents one by one and a separating belt 11. A predetermined separation pressure is generated between the separation transport roller 9 and the separating belt 11. The separating belt 11 is composed of rubber material having a slightly smaller friction coefficient than the separation transport roller 9. This separating belt 11 is wound around a separating belt pulley 10 and a driven pulley 12. Because the separation transport roller 9 is driven in a direction of feeding the document (clockwise direction in the same figure) and the separating belt 11 is driven in a direction of returning the document (clockwise direction in the same figure), the documents are separated one by one and fed.

A separated document is fed to a resist roller 15 and a resist driven roller 14, which are resist means. When a front end of the separated document abuts a nip unit of the stopped resist roller 15 and resist driven roller 14, a loop is generated in the document so that the front end of the document is arranged neatly. As a result, oblique feeding which may occur at the time of the flow scanning can be corrected. Then, the resist roller 15 is driven so that after the oblique feeding is corrected, the document is conveyed in the downstream.

Next, the document is introduced to a predetermined scanning position of the image reading unit 104 at the time of the flow scanning by a lead roller 17 and a driven roller 18. Then, scanning of the image is started. A white plate 20 which enables even a thin, transparent document to be scanned excellently is disposed on an opposite side to the image reading unit 104. The document whose image is being scanned is discharged from an image reading unit by a lead discharge roller 22 and a driven roller 21. During the scanning of an image, the lead roller 17 and the lead discharge roller 22 are driven with stabilized rotations. The image of a document being moved is scanned by the fixed image reading unit 104. Then, after the scanning of the image is terminated, the document is discharged to a discharge tray by a discharge roller 24 and a driven roller 25.

(Sensor)

Next, various kinds of the sensors will be described.

A document setting detection sensor 8, which is a light transmission type optical sensor for detecting that the document is set is provided in the document set tray 3. Additionally, a resist sensor 13, which is a light transmission type optical sensor for detecting the document, is provided between the separation transport roller 9 and the resist roller 15. This resist sensor 13 detects the front end of a separated document so as to control its abutting amount (loop amount) to the resist roller 15.

A lead sensor 16, which is a light transmission type optical sensor for detecting a document, is provided just after the resist roller 15. This lead sensor 16 detects an image scanning start timing at a predetermined scanning position at the time of the flow scanning of the document. A discharge sensor 23, which is a light transmission type optical sensor for detecting the document, is provided just before the discharge roller 24. This discharge 23 detects a discharge timing of the document.

(Driving System)

Next, the driving system of the motor and solenoid will be described.

A solenoid 51 is a keep solenoid for driving the feed roller 6. In normal condition, the solenoid 51 holds the feed roller 6 at an upper position (solid line position in the same figure) which is a home position and at the time of the sheet feeding operation, its keep force is turned off, so that the feed roller 6 is descended to a dotted line position indicated in the same figure. Consequently, the feed roller 6 is pressed contact with a topmost paper of the documents placed in the document set tray 3. At the same time, the shutter 7 is driven by the solenoid 51 and at the time of the paper feeding operation, the shutter 7 is descended interlockingly with the descent of the feed roller 6.

A separation motor 52 is a stepping motor. The separation transport roller 9, the feed roller 6 and the separating belt 11 are driven by this separation motor 52. A lead motor 53 is a stepping motor. The resist roller 15, the lead roller 17 and the lead discharge roller 22 are driven by this lead motor 53. A paper discharge motor 54 is a stepping motor and the discharge roller 24 is driven.

(Explanation of Height Adjustment)

Figure 5:
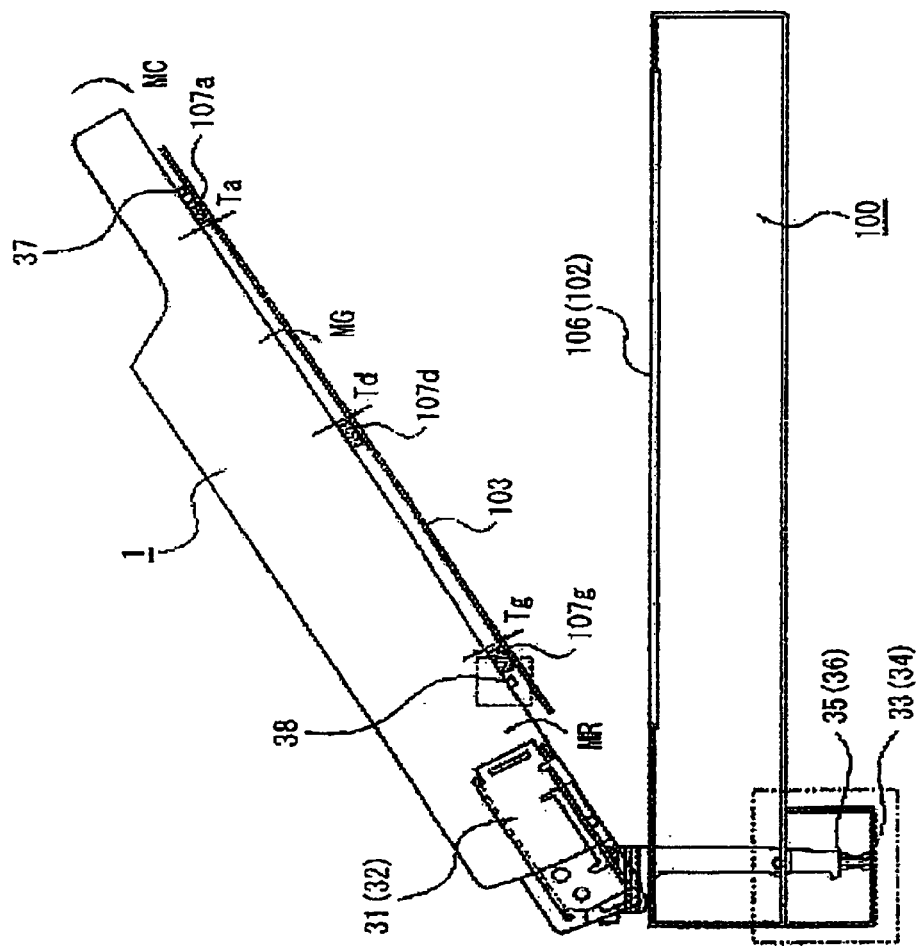
FIG. 5 is a left side view of the document feeding apparatus and the reading apparatus main body.

Referring to FIGS. 5 and 6, the structures of the document feeding apparatus 1 and the reading apparatus main body 100 according to an embodiment of the present invention will be described.

FIG. 5 shows a left side view of the document feeding apparatus 1 and the reading apparatus main body 100 and FIG. 6 shows a partially enlarged view of FIG. 5.

In the same figure, reference numeral 31 (32) denotes a pair of hinge units (right/left) for holding the document feeding apparatus 1 in its opening condition when user places a document on the platen glass 102. Reference numeral 33 (34) denotes a height adjustment bolt which is attached to the hinge unit 31 (32). Reference numeral 35 (36) denotes a height adjustment nut. Reference numerals 37, 38 denote height adjustment ribs which make contact with the platen glass 106 so as to adjust the height of the feeding unit 1 relative to the reading apparatus main body 100.

Each of these height adjustment ribs 37, 38 are provided separately or integrally on the front side and deep side of the pressing plate 103. As shown in FIGS. 2 and 6, the height adjustment ribs 37, 38 are provided such that their contact faces (rib front end faces) thereof are apart by a distance t from an opposing face of the image reading unit 104 of the white board 20. The distance t is a clearance necessary for the document sheet to pass at the time of flow scanning.

With the above-described structure, if the height adjustment rib 38 on the deep side has a gap relative to the platen glass 106 when the document feeding apparatus 1 is closed, the height adjustment nut 35 of the hinge unit 31 on the left side of the document feeding apparatus 1 is loosened and the height adjustment bolt 33 is tightened (decreasing h in the same figure). Consequently, the aforementioned gap is eliminated. Then, the height adjustment nut 35 is tightened and the height adjustment bolt 33 is fixed.

If the height adjustment rib 37 on the front side has a gap relative to the platen glass 106, the height adjustment nut 35 of the hinge unit 31 on the left side of the document feeding apparatus 1 is loosened and the height adjustment bolt 33 is loosened (increasing h in the same figure). Consequently, the aforementioned gap is eliminated. Then, the height adjustment nut 35 is tightened and the height adjustment bolt 33 is fixed.

If the adjustment of the height adjustment bolt 33 cannot abut the height adjustment ribs 37, 38 on the front side and deep side to the platen glass 106, the height adjustment nut 36 of the hinge unit 32 on the right side of the document feeding apparatus 1 is loosened and the height adjustment bolt 34 is loosened (increasing h in the same figure). Consequently, the right side of the document feeding apparatus 1 is raised. Then, the height adjustment nut 36 is tightened and the height adjustment bolt 34 is fixed, and again, the height adjustment bolt 33 of the hinge unit 31 on the left side is adjusted.

As a result, deflection in precision of components of the height adjustment ribs 37, 38 on the front side and deep side for adjusting the height of the document feeding apparatus 1 relative to the reading apparatus main body 100 and displacement in up and down direction due to distortion of the document feeding unit 1 itself can be corrected.

(Explanation of Hinge Unit)

The structures of the hinge unit 31 (32) of the document feeding apparatus 1 according to the embodiment of the present invention will be described with reference to FIGS. 7 and 9.

Figure 7:
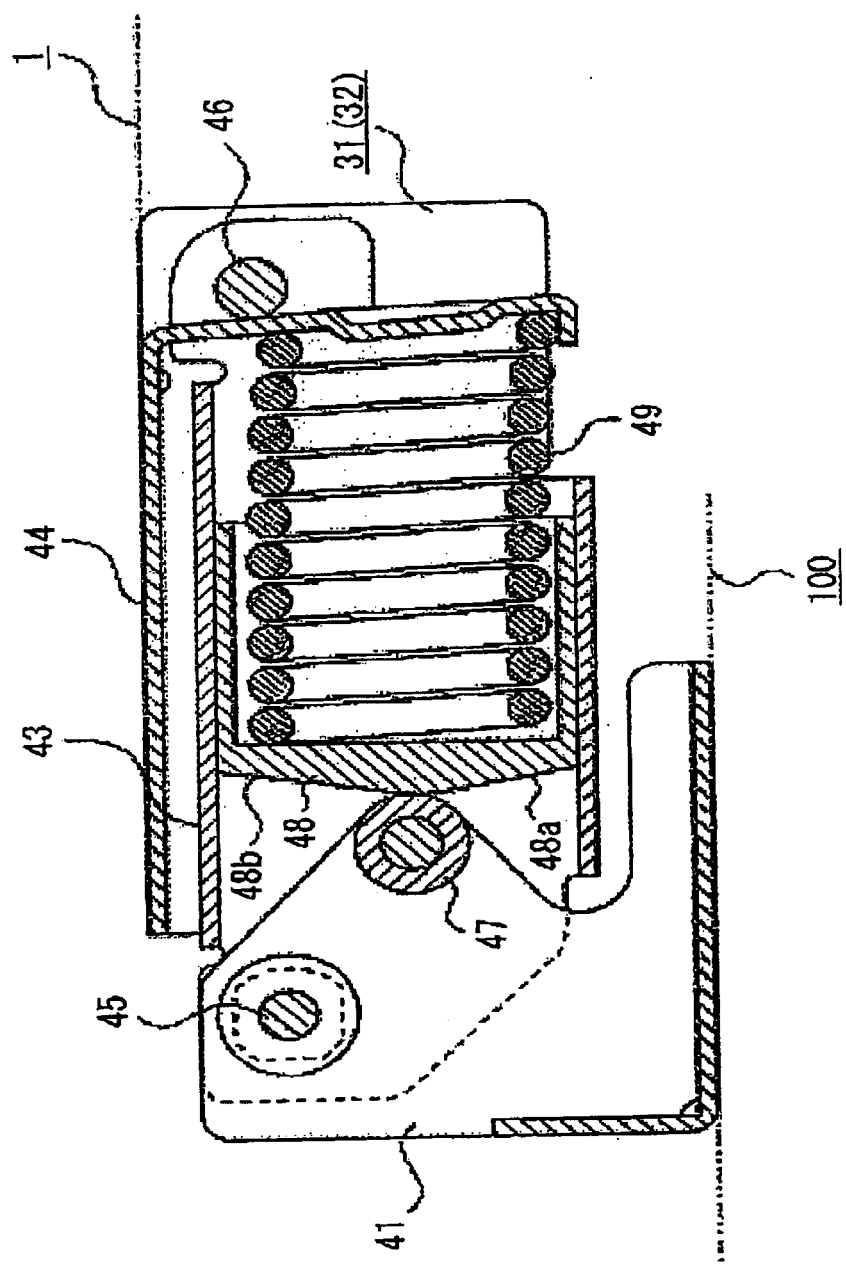
FIG. 7 is a schematic sectional view of a hinge unit in the document feeding apparatus according to the embodiment of the present invention.
Figure 8:
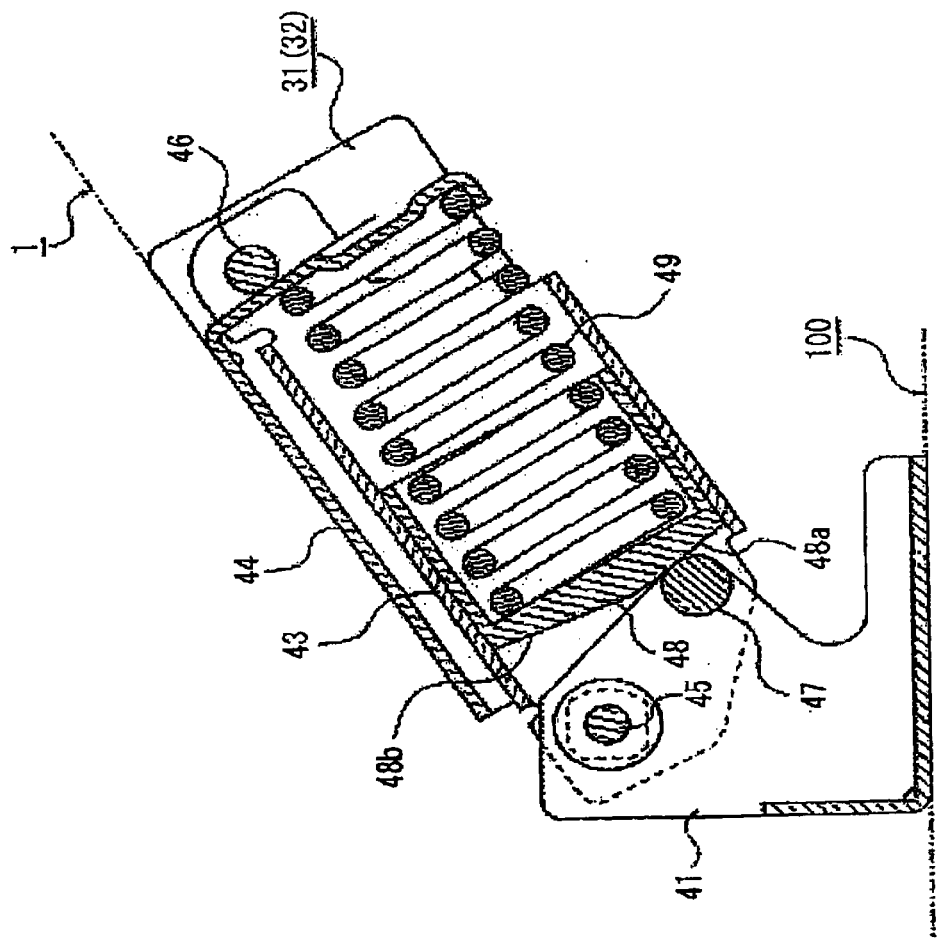
FIG. 8 is a schematic sectional view of the hinge unit in the document feeding apparatus according to the embodiment of the present invention.

FIGS. 7 and 8 are sectional views of the hinge unit 31 (32) of the document feeding apparatus 1. In the same figure, reference numeral 41 denotes a mounting plate. Then, hinge legs attached to this mounting plate 41 are inserted into the reading apparatus main body 100 expressed with a phantom line. Reference numeral 43 denotes a base plate. An end portion of the base plate 43 is joined to the mounting plate 41 through a fulcrum shaft 45 such that it is capable of rotating.

Reference numeral 44 denotes a lift plate. This lift plate 44 is joined to the other end portion of the base plate 43 through a swing shaft 46 such that it is capable of rotating. A rear portion of the document feeding apparatus 1 indicated with a phantom line is mounted on the lift plate 44. Further, a pressure receiving shaft 47 is provided on the mounting plate 41 such that it is not rotatable.

A cam slider 48 is provided slidably inside the base plate 43. Cam sections 48a, 48b of this cam slider 48 abut to the pressure receiving shaft 47.

A coil spring 49 is provided between the cam slider 48 and the lift plate 44. By this coil spring 49, the cam slider 48 is brought into a firm contact with the pressure receiving shaft 47 and at the same time, the lift plate 44 is biased in a direction of overlapping the base plate 43. Further, by the coil spring 49, the base plate 43 is biased in a direction of opening the document feeding apparatus 1 through the cam slider 48 and the lift plate 44, so that a force trying to close the document feeding apparatus 1 with its own weight is killed thereby and thus, the document feeding apparatus 1 can be held at a predetermined angle. If the document feeding apparatus 1 is closed further from that holding angle, the weight of the document feeding apparatus 1 overwhelms the biasing force of the hinge unit in its opening direction at a predetermined swing angle so that the document feeding apparatus 1 is closed gradually by its own weight. Then, when the document feeding apparatus 1 is closed completely, a force left by subtracting the biasing force of the hinge unit in its opening direction from the weight of the document feeding apparatus 1 is a closing force of the document feeding apparatus.

When the document feeding apparatus 1 is closed completely, a load of pressing the document feeding apparatus 1 against the platen glass 102 is applied by the closing force of the document feeding apparatus 1. Consequently, the sponges 107 are crushed and a restoration force is generated in each sponge 107. In this way, a force necessary for pressing the pressing plate 103 against the platen glass 102 is secured.

To close the document feeding apparatus 1 completely, a closing force of abutting the height adjustment ribs 37, 38 on the front side and deep side for adjusting the height of the document feeding apparatus 1 to the platen glass 106 is necessary. Thus, the closing force of the document feeding apparatus 1 is so designed to be larger than a force which crushes the sponges 107 up to a thickness necessary for making the height adjustment ribs 37, 38 into a contact with the platen glass 106.

If the document feeding apparatus 1 is opened from its closing state, the base plate 43 is rotated with the lift plate 44 so that as shown in FIG. 8, a contact position of the inclined cam portion 48a of the cam slider 48 with the pressure receiving shaft 47 is moved oscillatingly from a high position to a low position Consequently, the base plate 43 is biased through the lift plate 44 in the direction of opening the document feeding apparatus 1 by a rotary moment around the fulcrum shaft 45 generated by an abutting force of the pressure receiving shaft 47.

At this time, the document feeding apparatus 1 is opened by a spring force of the coil spring 49 in a state that its own weight is reduced.

If the hand is released from the document feeding apparatus 1 in an open condition, the pressure receiving shaft 47 tries to oscillate on the inclined cam portion 48a of the cam slider 48 biased by the coil spring 49 in a direction. Then, the pressure receiving shaft 47 receives a resistance when it climbs the cam portion 48a.

As a result, the rotary moment generated around the fulcrum shaft 45 by the weight of the document feeding apparatus 1 through the base plate 43 and a spring force of the coil spring 49 balance with a rotary torque generated depending on the contact position of the pressure receiving shaft 47 which is abutted to the inclined cam portion 48a of the cam slider 48.

According to the embodiment of the present invention, the document feeding apparatus 1 is stopped and held stably at an swing angle of more than 30°. When the document feeding apparatus 1 is closed, an inertial force is applied. However, rotation of the base plate 43 is restricted by the inclined cam portion 48a of the cam slider 48, control by the pressure receiving shaft 47 and a spring force of the coil spring 49 compressed by the cam slider 48, thereby preventing the document feeding apparatus 1 from being closed suddenly.

(Explanation of Sponge Arrangement)

The arrangement of the sponges 107 in the document feeding apparatus 1 of the embodiment of the present invention will be described with reference to FIGS. 9 and 10.

Figure 9:
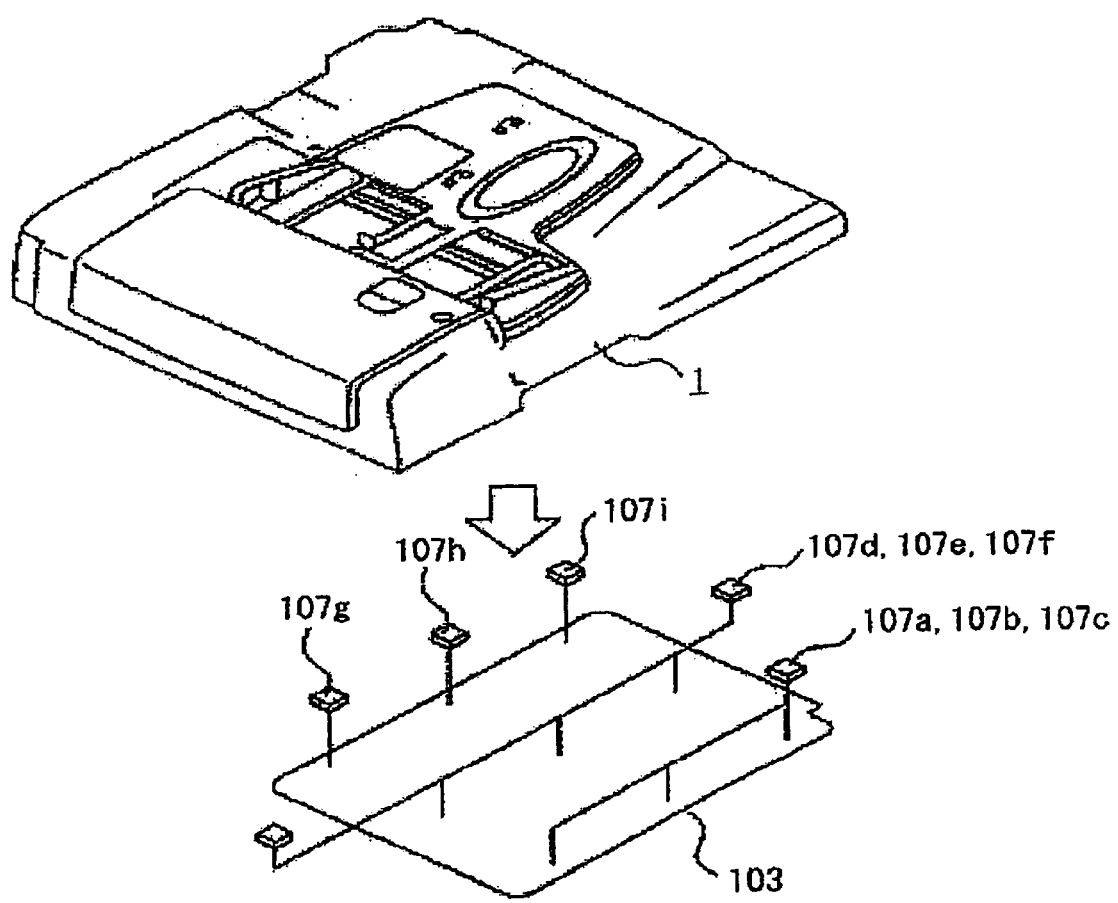
FIG. 9 is an explanatory diagram for explaining arrangement of sponges in the document feeding apparatus according to the embodiment of the present invention.
Figure 10:
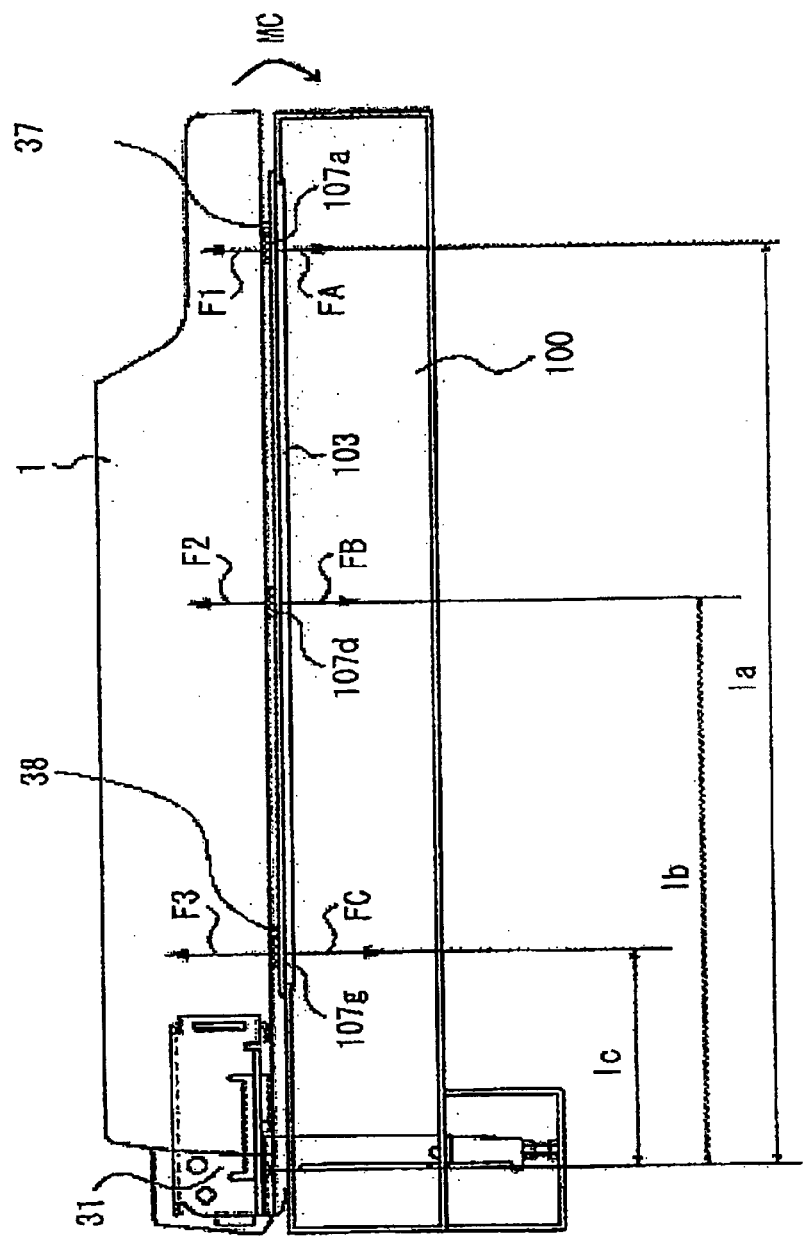
FIG. 10 is a diagram showing the relation of forces in the document feeding apparatus according to the embodiment of the present invention.
Figure 11:
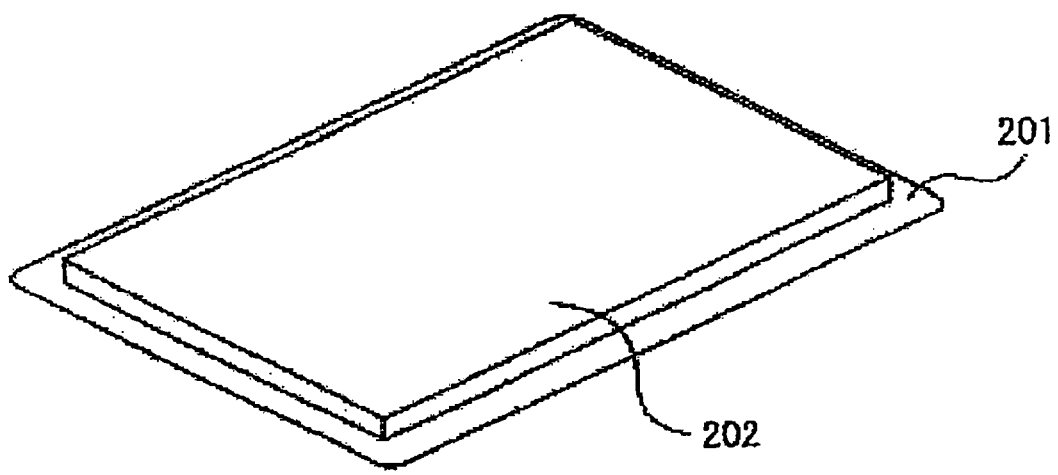
FIG. 11 is an explanatory diagram for explaining arrangement of the-sponge in the document feeding apparatus according to a conventional technology.
Figure 12:
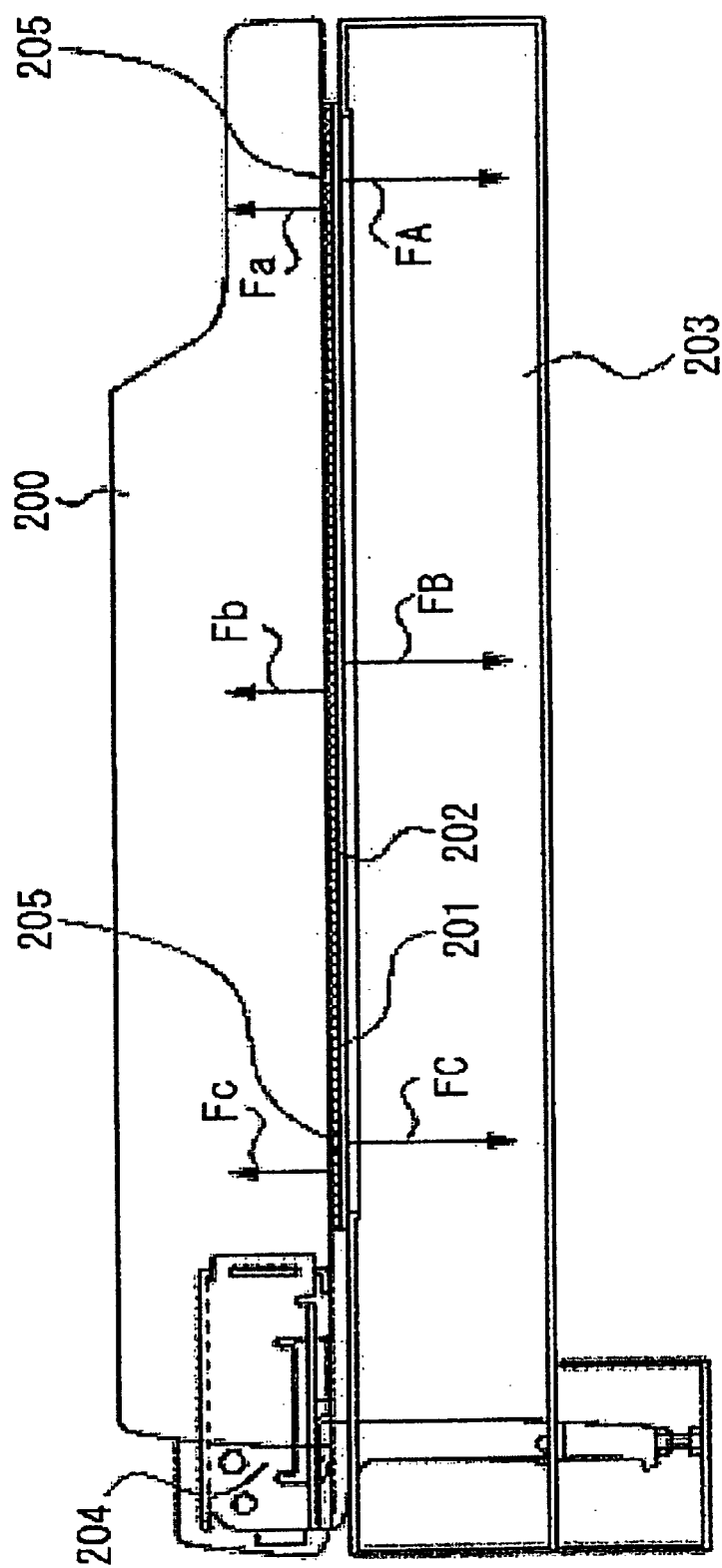
FIG. 12 is a diagram showing the relation of forces in the document feeding apparatus according to the conventional technology.

FIG. 9 shows a perspective view of the sponge arrangement in the document feeding apparatus 1 and FIG. 10 shows the relation of forces in the document feeding apparatus 1.

The sponges 107 as elastic members for pressing the pressing plate 103 against the platen glass 102 are constituted of nine sponges 107a to 107i each having the same area, 107a, 107b, 107c disposed on the front line of the document feeding apparatus 1, 107d, 107e, 107f in the center and 107g, 107h, 107i on the deep line, that is, three lines being disposed laterally while each line contains three. Assuming that thickness of each of the sponges 107a to 107i is Ta to Ti, as shown in FIG. 5, the thicknesses Ta to Ti are as follows:

$$Ta=Tb=Tc<Td=Te=Tf<Tg=Th=Ti$$

The sponges 107a to 107i are disposed on the pressing plate 103.

If the height adjustment ribs 37, 38 abut to the reading apparatus main body 100, the sponges 107a to 107i are crushed corresponding to the gap formed between the document feeding apparatus 1 and the reading apparatus main body 100. If it is assumed that the restoration forces generated depending on the crush level of the sponge 107a to 107i are Fa to Fi, a relation of Fa=Fb=Fc<Fd=Fe=Ff<Fg=Fh=Fi is established. (hereinafter, expressed with relations of Fa+Fb+Fc=1 (front side), Fd+Fe+Ff=F2 (center), Fg+Fh+Fi=F3 (deep side))

When the document feeding apparatus 1 is closed, a closing force gained by subtracting the biasing force in the opening direction of the hinge unit 21 from the weight of the document feeding apparatus 1 acts.

By disposing the plurality of sponges on the pressing plate 103 at some interval, the total restoration force of the sponges generated when the document feeding apparatus 1 is closed becomes smaller than a conventional image reading apparatus in which the sponges are bonded to an entire back face of the pressing plate. Thus, because the closing force necessary for crushing the sponges by a predetermined amount can be decreased, consequently, the biasing force in the opening direction of the hinge unit 31 can be increased.

If a balance of the hinge unit 31 around its center of rotating is considered, a force obtained by subtracting an biasing moment MR of the hinge unit 31 acting in the opening direction of the hinge unit 31 from a moment MG generated when the weight of the document feeding apparatus 1 acts on the gravity center of the document feeding apparatus 1 acts on the document feeding apparatus 1 as a closing force moment MC (see FIG. 5).

With the document feeding apparatus 1 closed, the closing force moment MC acts on the sponges 107a to 107i so that the restoration force of the crushed sponge acts in an opposite direction to the closing force.

In a process of closing the document feeding apparatus 1, the sponge column 107g, 107h, 107i receive the closing force moment MC at a position apart by 1c from the center of rotation. At this time, a closing force SC of MC/1c is applied to the sponge column 107g, 107h, 107i.

If the document feeding apparatus 1 is closed further, the sponge column 107d, 107e, 107f located in the center receive a closing force moment gained by subtracting the restoration force moment generated by the sponge column 107g, 107h, 107i from the closing force moment MC at a position apart by 1b from the center of rotation. At this time, a closing force FB is applied to the sponge column 107d, 107e, 107f.

Finally, just before the closing operation of the document feeding apparatus 1 is almost completed, the sponge column 107a, 107b, 107c on the front side begin to receive a closing force moment gained by subtracting a restoration moment generated by the sponge column 107d, 107e, 107f from the closing force moment at a position 1b at a position apart by 1a from the center of rotation. At this time, a closing force FA acts on the sponge 107a, 107b, 107c.

According to this embodiment, because the respective sponge columns are in the relation of 1c<1b<1a, the relation in the closing force among the front side, the center and the deep side of the document feeding apparatus 1 is FC>FB>FA.

To relax an impact when the document feeding apparatus 1 is closed, the respective restoration forces of the respective sponge columns of the front side, center and deep side need to be set up over each predetermined value depending on a closing force received at each position. Further, to settle the document feeding apparatus 1 appropriately after the sponges are crushed, the restoration forces of the respective sponge columns are set smaller than the closing force at each position.

When the document feeding apparatus 1 is settled on the reading apparatus main body 100, the front side of the document feeding apparatus 1 is most affected by the sponge restoration force. Thus, according to this embodiment, the relation-between the closing force FA on the front side and the sponge restoration force F1 on the front side is adjusted so as to realize optimum settling performance.

Here, the force relation on the front side of the document feeding apparatus 1 of this embodiment will be described. That is, to secure a minimum closing force necessary for abutting the height adjusting ribs 37, 38 on the front side and deep side to the platen glass 106 while the sponges on the front side of the document feeding apparatus 1 are crushed, the biasing force of the hinge unit 31 is adjusted corresponding to the weight of the document feeding apparatus 1 so as to set up the closing force FA on the front side.

Therefore, the relation of FA to F1>0 is established on the front side of the document feeding apparatus 1. According to this embodiment, because the restoration force on the front side is set to a minimum force necessary for pressing the pressing plate 103, it can be set smaller than the closing force FA on the front side of the document feeding apparatus 1.

On the sponge columns on the front side and in the center also, a minimum restoration force necessary for each position is set to prevent an impact sound from being generated when the document feeding apparatus 1 is closed while crushing the sponges securely in a process of the closing operation of the document feeding apparatus 1. Therefore, the total restoration force can be made smaller than a case where the restoration force of all the sponge columns is set equal to the largest restoration force F3 on the deep side.

By setting the restoration force of each sponge column so that the restoration force is decreased as it goes farther from the center of rotating of the hinge as described above, the total restoration force of the sponges generated when the document feeding apparatus 1 is closed is decreased further as compared to the case where plurality of sponges each having the same restoration force are disposed. As a result, the biasing force in the opening direction of the hinge unit 31 can be increased.

By decreasing the restoration force and the closing force, the biasing force acting in the opening direction of the hinge unit 31 (32) is increased, so that a user's operation force for opening the document feeding apparatus 1 can be decreased further. Further, the height adjusting ribs 37, 38 can be settled on the reading apparatus main body 100 securely.

Although according to the above-described respective embodiments, the restoration forces Fa to Fi generated in the sponges 107a to 107i are varied by varying the thickness of the sponges 107a to 107i, it is permissible to change not the thickness but the density (degree of foaming) or its material so as to change its modulus of elasticity.

Alternatively, it is permissible to vary the contact area between the sponge and the pressing plate 103 so as to obtain the same effect as when the thickness T is changed.

As described above, in the image reading apparatus of this embodiment, the sponge member, which is an elastic member for generating the pressing force by the pressing plate 103, is divided to plurality of sponges 107a to 107i and these plurality of sponges are disposed, and additionally, the restoration force of the sponges is set smaller as it goes farther from the hinge unit 31 (32), which is a center of rotating when the document feeding apparatus 1 is opened or closed, so that the total sponge restoration force can be decreased. Consequently, a minimum closing force necessary for that purpose can be set up. As a result, the biasing force acting in the opening direction of the hinge unit 31 (32) can be increased, thereby decreasing the operation force for opening the document feeding apparatus 1 having a large weight.

As described above, according to the present invention, the biasing force acting in the opening direction of the hinge unit can be set as large as possible. Consequently, the operation force acting in the opening direction of the document feeding apparatus can be decreased further.

Additionally, adjustment of the height of the document feeding apparatus is facilitated and an impact sound which may occur when the document feeding apparatus is closed can be reduced.

What is claimed is:

1. An image reading apparatus comprising:

a reading apparatus main body having a document base on which an original document is placed and a scanning unit which scans an image of the original document placed on the document base;

a document pressing device which is provided so that the document pressing device is rotatable with respect to the reading apparatus main body; and an opening/closing unit which supports the document pressing device so that the document pressing device is movable between a pressing position where the original document is pressed on the document base and an opening position where the original document is released, wherein the document pressing device has a pressing plate which presses the original document on the document base and a plurality of elastic members provided apart from each other on a face of the pressing plate opposite to the document base between a center of rotating of the document pressing device and an opening/closing end of the document pressing device, wherein the opening/closing unit has a force applying mechanism which applies a predetermined force in a direction so that a weight of the document pressing device is reduced, and had an adjusting mechanism which adjusts the height of the document pressing device with respect to the reading apparatus main body on the pressing position so that the plurality of elastic members are deformed when the document pressing device moves to the pressing position, and the restoration forces by deformation of the plurality of elastic members on the pressing position are set to be smaller so that the elastic members are disposed at a position further from the center of rotating of the document pressing device.

2. The image reading apparatus according to claim 1, wherein the plurality of elastic members have a smaller thickness as the elastic member are disposed at a position further from the center of rotating of the document pressing device.

3. The image reading apparatus according to claim 1, wherein the plurality of elastic members have a smaller modulus of elasticity as the elastic members are disposed at a position further from the center of rotating of the document pressing device.

4. The image reading apparatus according to claim 1, wherein the plurality of elastic members have a smaller contact area with the pressing plate as the elastic members are disposed at a position further from the center of rotating of the document pressing device.

5. The image reading apparatus according to claim 1, wherein the document pressing device further comprises a document feeding unit which conveys the original document to a scanning position on the document base.

6. The image reading apparatus according to claim 5, wherein the document feeding unit has a guide which guides the original document to a scanning position on a document base, further comprising:

a holding member which holds a gap between the guide and the document base at a predetermined size; and an adjusting member which adjusts the predetermined gap by the holding member.

7. An image forming apparatus comprising:

an image reading apparatus which scans an original document image; and an image forming unit which forms an image based on information of the scanned original document image, the image reading apparatus comprising:

a reading apparatus main body having a document base on which an original document is placed and scanning unit which scans an image of the original document placed on the document base;

a document pressing device which is provided so that the document pressing device is rotatable with respect to the reading apparatus main body; and an opening/closing unit which supports the document pressing device so that the document pressing device is movable between a pressing position where the original document is pressed on the document base and an opening position where the original document is released, wherein the document pressing device has a pressing plate which presses the original document on the document base and a plurality of elastic members provided apart from each other on a face of the pressing plate opposite to the document base between a center of rotating of the document pressing device and an opening/closing end of the document pressing device, wherein the opening/closing unit has a force applying mechanism which applies a predetermined force in a direction so that a weight of the document pressing device is reduced, and has an adjusting mechanism which adjusts the height of the document pressing device with respect to the reading apparatus main body on the pressing position so that the plurality of elastic members are deformed when the document pressing device moves to the pressing position, and the restoration forces by deformation of the plurality of elastic members on the pressing position are set to be smaller so that the elastic members are disposed at a farther position from the center of rotating of the document pressing device.

8. The image forming apparatus according to claim 7, wherein the plurality of elastic members have a smaller thickness as the elastic member are disposed at a position further from the center of rotating of the document pressing device.

9. The image forming apparatus according to claim 7, wherein the plurality of elastic members have a smaller modulus of elasticity as the elastic members are disposed at a position further from the center of rotating of the document pressing device.

10. The image forming apparatus according to claim 7, wherein the plurality of elastic members have a smaller contact area with the pressing plate as the elastic members are disposed at a position further from the center of rotating of the document pressing device.

11. The image forming apparatus according to claim 7, wherein the document pressing device has a document feeding unit which conveys the original document to a scanning position on the document base.

12. The image forming apparatus according to claim 11, wherein the document feeding unit has a guide which guides the original document to a scanning position on the document base, and said image forming apparatus further comprises:

a holding member which holds a gap between the guide and the document base at a predetermined amount; and an adjusting member which adjusts the predetermined amount held by the holding member.

* * * * *

UNITED STATES PATENT AND TRADEMARK OFFICE
CERTIFICATE OF CORRECTION

PATENT NO. : 6,957,037 B2
DATED : October 18, 2005
INVENTOR(S) : Takuya Terae et al.

It is certified that error appears in the above-identified patent and that said Letters Patent is hereby corrected as shown below:

Column 1,
Line 23, "members" should read -- member --.

Column 2,
Line 23, "200" should read -- 200. --.

Column 3,
Line 26, "member" should read -- members --.

Column 10,
Line 59, "control" should read -- controlled --.

Column 13,
Line 59, "had" should read -- has --.

Column 14,
Line 6, "member" should read -- members --.

Column 15,
Line 12, "member" should read -- members --.

Signed and Sealed this

Fourteenth Day of March, 2006

JON W. DUDAS
*Director of the United States Patent and Trademark Office*